July 23, 1929. E. O. KEATOR 1,722,000
CABLE CLIP
Filed April 5, 1928
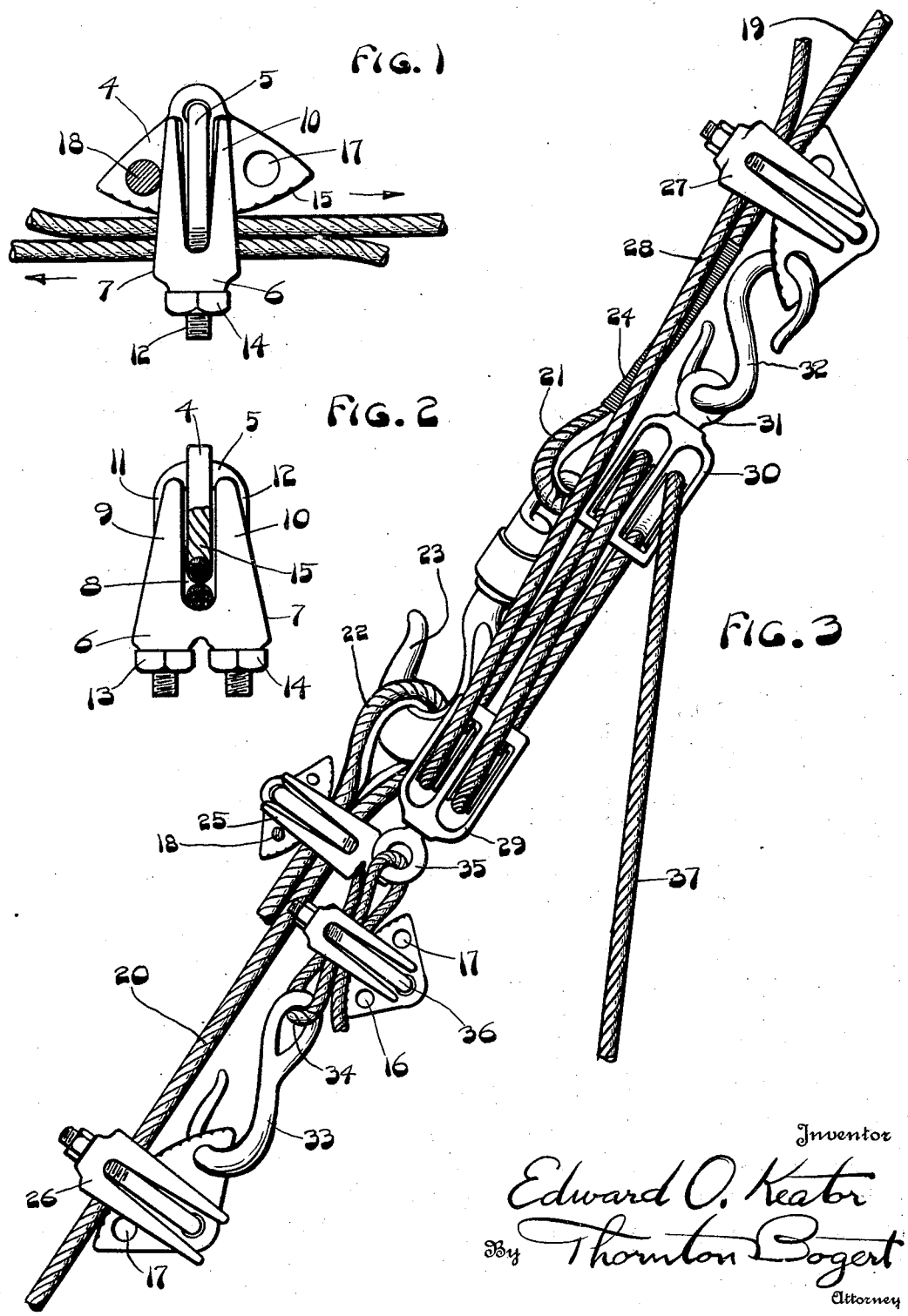

Patented July 23, 1929.

1,722,000

UNITED STATES PATENT OFFICE.

EDWARD O. KEATOR, OF DAYTON, OHIO.

CABLE CLIP.

Application filed April 5, 1928. Serial No. 267,686.

This invention is an improvement on my cable clip which is exemplified in patents which have been issued to me and the general form of which is shown in the drawing accompanying this description.

An object of this invention is to produce an improved cable clip which will enable the gripping action of the clip to be materially increased over other clips known to me and which in addition to being an improvement over the cam style of cable clip for which Letters Patent have been issued to me, will also afford greatly increased safety in the use of the clip.

These and other objects are attained in the improved form of cable clip which I am about to describe and which is illustrated in the accompanying drawing, in which:—

Fig. 1 is a cable clip embodying my invention showing its application to two cables which it is gripping.

Fig. 2 is an end view showing the cable clip disclosed in Fig. 1.

Fig. 3 is a perspective view showing a typical installation utilizing my improved cable clip in two capacities, one in a permanent installation and the other of which is for temporary use.

The clip to which my present invention is especially directed is that which, as has been said has been patented by me and which covers a clip utilizing a cam 4 in conjunction with a U-shaped bolt 5 having its legs passing through the base 6 of a body 7. This clip has a cable receiving channel 8 in which the cables are located and in which the cam moves in contact with the cables. Thus the body 7 has branches 9 and 10 which straddle the cables from one side while the branches 11 and 12 of the bolt 5 straddle the cables from the opposite side, nuts 13 and 14 serving to draw the body and bolt elements toward each other in order that the cam may be brought tightly into engagement with the cables. As is usual and especially as has been described in my patented structures I have provided grooves 15 in the cable engaging surface, which, in conjunction with similar grooves in the cable-engaging surface of the body, fit the cable strands and groups of strands.

Under ordinary conditions the cam clip which I have just described briefly is the most efficient type of cable clip known, in that it not only grips the cables with less tendency to slippage than in the ordinary clip because of the grooved formation of the body and cam-contacting surfaces, but also because of the increasing gripping action of the cam on the cables when slippage does take place, owing to the rocking of the cam on its pivot. Therefore, without unusual pressure being brought to bear upon the U-bolt by having to draw the nuts 13 and 14 up very tightly, the clip will give maximum gripping power with little pressure on the nuts.

However, in order that this efficiency may be increased further and still render the clip of greater safety than has been developed even in the patented forms of my clip, I have provided the cam with holes 16 and 17 which are located near the grooved and side faces or edges of the cam as shown, so that rocking motion of the cam may be accomplished within reasonable limits without obstruction of the holes by the clip body. The purpose of these holes is, as has been said in the beginning of this description, two fold. First, if a pin such as 18, which I have shown in Fig. 1, is placed in one of the holes of the cam, its rocking movement will be limited thereby when any excessive pull is exerted on the cables, as represented by the arrows in Fig. 1. This then prevents the cam from moving excessively in its rotation upon the bolt and positively prevents the possibility of the cam moving completely through and beyond the base channel, thereby freeing the cables and allowing them to pull apart.

The second purpose of these holes 16 and 17 is to afford a convenient means by which other attachments may be made to the cable or cables to which the clip or clips may be attached. For example, the disclosure made in Fig. 3, although but suggestive of this use, illustrates but one way in which this provision of holes in the cam of a cam-clip may be utilized. Here we have the ends of two cables 19 and 20 which have been provided with the respective eyes 21 and 22, to the former of which a hook 23 is attached and into the latter of which the hook is hooked. Eye 21 has been shown as having been formed in spliced or wire wrapped manner 24 while eye 22 has been shown as having been formed by utilizing a cam-clip 25 which embodies my patented invention as well as the novelty described herein. The purpose to which the invention is to be placed in the exemplary disclosure is that of drawing cables 19 and 20 toward each other in order to permit the hook to be released, as in taking down rigging and the like which has been tightly stretched for certain purposes. This may be readily accomplished by attaching a clip 26 of my improved construction to cable 20 by merely drawing up the nuts with the fingers, pliers or lightly with a wrench. A similar clip 27 is attached in the same manner to cable 19, the end of a rope 28 being clipped therewith for the temporary attachments which will now be described. This rope 28 is passed around the pulleys of the pulley blocks 29 and 30 in the usual manner, which blocks are attached to the respective cables 19 and 20 by means of the clips 26 and 27 in the following manner. The eye 31 of the block 30 is attached to clip 27 by means of a double hook 32 which is hooked through eye 31 and through the nearest one of the holes in the cam 4 of clip 27. The block 29 is attached to clip 26 by a slightly different means than that just described, in that a single hook 33 is hooked through the nearest of the cam holes of clip 26, while a short wire or rope connection 34 connects hook 33 with the eye 35 of block 29, a cam-clip 36 being used to grip the bights of the connection 34.

Thus when the free end 37 of rope 28 is pulled the pulley blocks are drawn toward each other. This draws upon hooks 32 and 33 thereby causing the cams of the clips 26 and 27 to rock upon their mounting bolts and thus grip the cables 19 and 20 very tightly so that they are drawn toward each other in order to release the hook 23. The release of this temporary attachment is just as easily accomplished. Thus the second purpose of the provision of the holes in the cam clip cams has been set forth.

Having thus described my invention what I claim is:

1. A cable clip comprising a body having a cable-receiving channel therein, a bolt lug on each side of the channel, a U-shaped bolt passing over and across said channel and through the lugs and having tightening means on its ends, and a cam pivotally mounted on the bolt and occupying the channel, adapted to be drawn by the bolt into gripping engagement with the cable or cables occupying the channel, said cam extending beyond the body and having means for attachment thereto of cam operating connections.

2. A cable-clip comprising a U-shaped bolt, a body reciprocally mounted on the branches of the bolt, nuts adjustably mounted on the branches of the bolt, and a cam on the bolt between the branches, said nuts being adapted to bring the cam toward the body to clamp the cables between it and the body, said cam at its ends extending beyond the body and having means at its ends for attachment of cam operating connections thereto.

3. A cable clip comprising a cable clip of conventional design, and a cam associated therewith shaped to facilitate movement thereof and having means for attachment thereto of cam operating connections.

4. A cable clip comprising a body having a cable-receiving channel therein, a bolt lug on each side of the channel, a U-shaped bolt passing across said channel and through the lugs and having tightening means on its ends, and a cam pivotally mounted on the bolt and occupying the channel, adapted to be drawn by the bolt into gripping engagement with the cable or cables occupying the channel, said cam extending beyond the body and having a hole through it adjacent to each end of its cam surface to permit of the insertion therethrough of pins, hooks or other means which restrict its movement by engaging the body or facilitate its movement by exerting a pull thereon.

5. A cable clip comprising a U-shaped bolt, a body reciprocally mounted on the branches of the bolt, nuts adjustably mounted on the branches of the bolt, and a cam on the bolt between the branches, said nuts being adapted to bring the cam toward the body to clamp cables between it and the body, said cam at its ends extending beyond the body and having holes in its ends for receiving pins, hooks or other means which restrict its movement by engaging the body or facilitate its movement by exerting a pull thereon.

6. A cable clip comprising a cable clip of conventional design, and a cam associated therewith shaped to facilitate movement thereof with a hole through it to receive a pin, hook or other means which may restrict its movement by engaging with other elements of the clip or facilitate its movement by exerting a pull thereon.

In testimony whereof I have hereunto affixed my signature.

EDWARD O. KEATOR. [L. S.]